US012273255B1

(12) United States Patent
Bhatnagar et al.

(10) Patent No.: US 12,273,255 B1
(45) Date of Patent: Apr. 8, 2025

(54) ADAPTIVE TESTING SERVICE THAT GENERATES TEST CASES FROM OBSERVED BEHAVIORS

(71) Applicant: Amazon Technologies, Inc., Seattle, WA (US)

(72) Inventors: Abhijit Prakash Bhatnagar, Bellevue, WA (US); Yusof Ganji, Bellevue, WA (US); Mohsen Azimi, Seattle, WA (US); Jason Adonis Timmons, Seattle, WA (US); Jacob Shannan Carr, Seattle, WA (US); Tristan Niles Cecil, Los Altos, CA (US); Evan Corriere, Sunnyvale, CA (US); Sahil Sharma, San Francisco, CA (US); Xinrui Li, Seattle, WA (US); Huaqing Fang, New Jersey, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 18/479,712

(22) Filed: Oct. 2, 2023

(51) Int. Cl.
*H04L 43/55* (2022.01)
*H04L 43/024* (2022.01)
*H04L 43/106* (2022.01)
*H04L 41/147* (2022.01)

(52) U.S. Cl.
CPC ............ *H04L 43/55* (2022.05); *H04L 43/024* (2013.01); *H04L 43/106* (2013.01); *H04L 41/147* (2013.01)

(58) Field of Classification Search
None
See application file for complete search history.

(56) References Cited

U.S. PATENT DOCUMENTS

| 8,418,000 | B1* | 4/2013 | Salame ............... G06F 11/0709 714/26 |
| 8,539,282 | B1* | 9/2013 | Kabanov ............. G06F 11/3688 717/124 |
| 9,489,289 | B2 | 11/2016 | Hu et al. |
| 9,609,459 | B2 | 3/2017 | Raleigh |
| 9,703,686 | B2 | 7/2017 | dos Santos et al. |
| 10,372,572 | B1* | 8/2019 | Kesarwani ............ G06F 11/261 |
| 10,678,666 | B1* | 6/2020 | Gauf ................... G06F 11/2635 |

(Continued)

FOREIGN PATENT DOCUMENTS

WO   WO-2005045673 A2 *   5/2005   .......... G06F 11/3664

*Primary Examiner* — Phyllis A Book
(74) *Attorney, Agent, or Firm* — Robert C. Kowert; Kowert, Hood, Munyon, Rankin & Goetzel, P.C.

(57) ABSTRACT

Techniques are disclosed to implement an adaptive testing service (ATS) capable of automatically generating test cases for a network service to adapt test coverage to observed behaviors of the network service. In embodiments, the ATS uses telemetry data from a production version of the network service to identify classes of testable behaviors. Test cases are generated for the behaviors and assigned weights based on frequency or recency metrics of the behaviors. The test cases are stored in a test case repository, and may be used to monitor the production version of the network service or verify code changes to a development version of the network service. The test case weights may be used to select which test cases to run or determine whether code changes should be accepted or rejected. The test cases are evolved over time to adapt to behavior changes in the network service.

20 Claims, 10 Drawing Sheets

(56) References Cited

U.S. PATENT DOCUMENTS

| | | | |
|---|---|---|---|
| 11,074,161 B2 | 7/2021 | Culibrk et al. | |
| 2015/0254165 A1* | 9/2015 | Baril | G06F 11/3676 |
| | | | 714/38.1 |
| 2016/0357660 A1* | 12/2016 | Dean | G06F 8/00 |
| 2018/0007175 A1* | 1/2018 | Tischart | H04L 63/08 |
| 2018/0349257 A1* | 12/2018 | Bhattacharjee | G06F 8/41 |
| 2019/0079854 A1* | 3/2019 | Lassance Oliveira E Silva | |
| | | | G06F 11/368 |
| 2021/0004310 A1* | 1/2021 | Srinivasan | G06F 8/65 |
| 2021/0089434 A1* | 3/2021 | Dhanda | G06F 11/3684 |
| 2022/0303206 A1* | 9/2022 | Saxena | H04L 43/062 |
| 2023/0055527 A1* | 2/2023 | Majithia | G06F 11/0772 |
| 2023/0205679 A1* | 6/2023 | Freeman | G06F 11/3692 |
| | | | 717/124 |
| 2024/0362157 A1* | 10/2024 | Kushnir | G06F 11/3688 |

\* cited by examiner telemetry log record
310

```
datum::{
  start_time: 2023-09-01T01:01:01
  duration: PT1S
  routeId: 1
  requestIn::{                                    observed
    version: "http/1.1",                           request
    verb: "GET",                                     320
    scheme: "https",
    host: "reverse-proxy.useast.xyz.com",
    port: 444,
    path: "/",
    query_map_ordered: {
      0_s: [ "A", "B" ]
    },
    header_map: {
      host: [ "www.xyz.com" ]
    }
  },

...

responseOut::{                                  observed
    status_code: 200,                             response
    status_reason: OK,                              330
    header_map: {
      'content-type': [ "text/html" ],
      'content-length': [ 12345 ],
      'content-hash': [md5checksum]
    }
  }
}
```

FIG. 3

Test Case Searching 710

Search in Environments: 720

Region: New York

Fabric: All

Domain: **\*.xyz.com**

Additional Search Conditions: 730

Test case generated for Version 3.4,

Test case passed in last 30 days,

Test case failed in last 5 days, and

Test case weight >= 60.

[ Search ]

Search Results 740

Service XYZ generates valid proxy packets

Given request types P and Q, proxy packets should not contain illegal fingerprints F and G.

[ View Details ]  [ Run Now ]

Service XYZ connectivity in high demand

During high demand period, connections to backend server ports 333 and 444 should remain up.

[ View Details ]  [ Run Now ]

Service XYZ blocks JJJ cyberattack

Given JJJ attack signature in request, response should indicate throttle code and warning in body.

[ View Details ]  [ Run Now ]

*FIG. 7*

Code Change Review 810

| Code Change 820 | Regression Test 822 | Test Result 824 | Last Pass 826 | Test Weight 828 |
|---|---|---|---|---|
| Request R new parameters | Service responds to request R | Pass | | 90 |
| Request S code refactor | Service responds to S with code 200 | Pass | | 5 |
| | Service responds to S with code 400 | Fail | 2 day(s) ago | 5 |
| Proxy security header insert | Proxy adds security header | Pass | | 60 |
| New cookie values | Proxy stores and retrieves cookie value C | Pass | | 60 |
| | Proxy combines cookie values C and D | Pass | | 60 |
| Failover reconnect | Failover reconnect occur in 2s | Pass | | 90 |

Review Actions 830

Recommendation 850

Test case "Service responds to S with code 400" failed in the last regression test. We recommend accepting the change despite the failure because this test case has a low test weight and the change is expected and desired. Note that setting the weight to 0 will cause this test to be deprecated.

Behavior Change Feedback 840

Change Expected?
● Yes  ○ No

Change Desirable?
● Yes  ○ No

[ Accept Change ]

[ Reject Change ]

[ Update Test Weight ]

[ Create New Test Case ]

*FIG. 8*

ADAPTIVE TESTING SERVICE THAT GENERATES TEST CASES FROM OBSERVED BEHAVIORS

BACKGROUND

Technology companies are continuously upgrading and changing network services that support their day-to-day operations. When upgrading a production version of a network service, testing is performed to ensure that changes implemented in the new version do not unexpectedly break existing behavior of the production version. However, testers can face significant challenges during such testing. First, the testing requires manual creation of a set of test cases to cover new behaviors of the service, a task that can be extremely labor intensive and error prone. This problem is aggravated when the service is deployed in multiple execution environments where the service can behave differently across the environments, or is used by many client applications with different sets of requirements. Second, for some older services, there can be a lack of documentation and/or knowledge of the original functional specifications of the service so that the creation of a complete set of test cases is not possible. Third, the test cases need to be continuously updated over time to keep up with the changing behavior of the service, for example, to add new test cases for new features introduced during development cycles and retire tests cases for features that are no longer relevant. The speed and magnitude of these behavior changes can lead to inadequate test case coverage and a general reduction in the confidence in service behavior correctness.

BRIEF DESCRIPTION OF THE DRAWINGS

FIG. 3 illustrates a telemetry log record that is used by the ATS to generate test cases, according to some embodiments.

FIG. 7 illustrates a GUI for performing searching and ad hoc execution of test cases generated by the ATS, according to some embodiments.

FIG. 8 illustrates a GUI for reviewing code changes to a development version of the network service, according to some embodiments.

Figure 1:
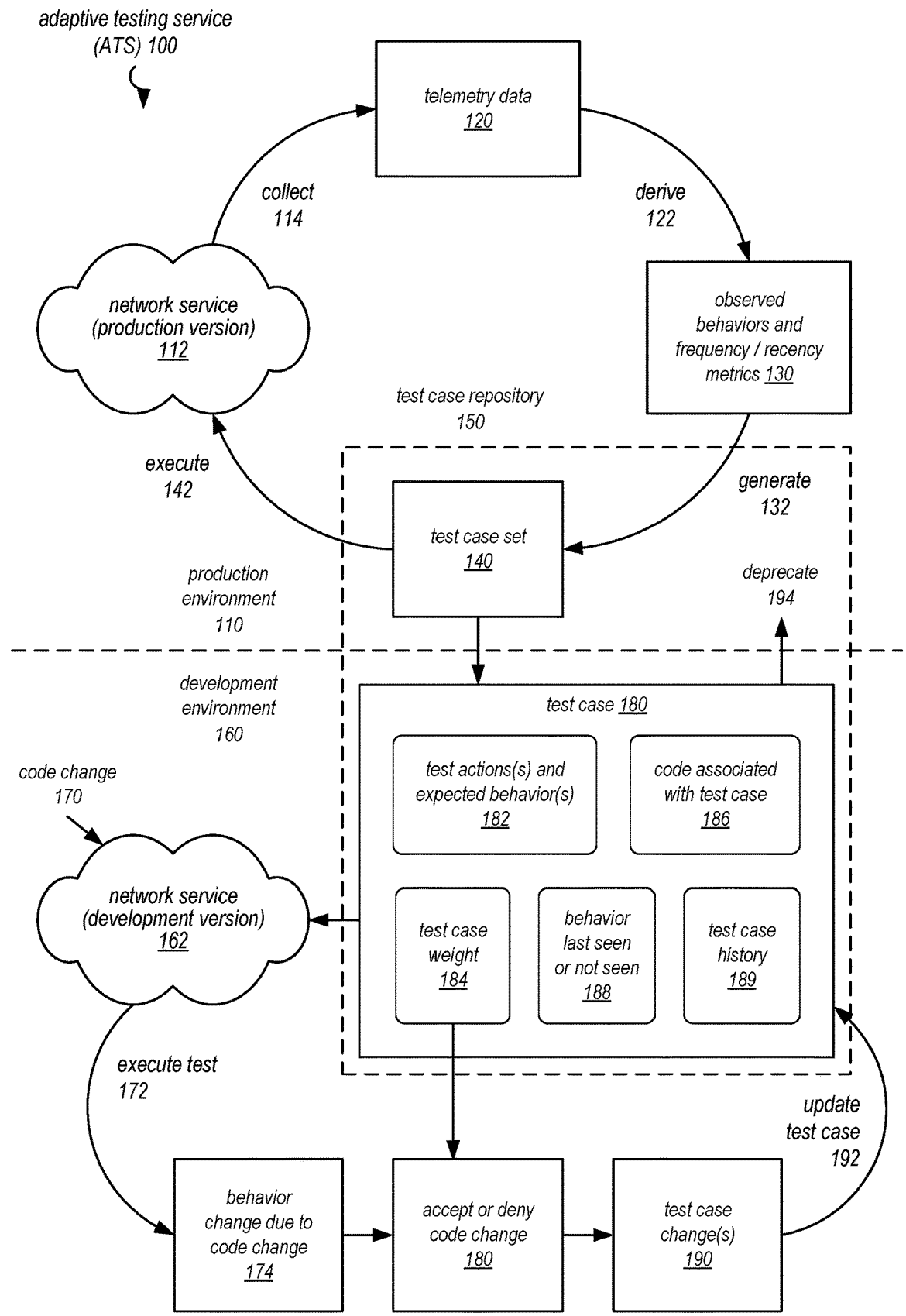
FIG. 1 illustrates an adaptive testing service (ATS) capable of automatically generating and deprecating test cases to maintain test coverage over observed behaviors of a network service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Technology companies are constantly upgrading and changing their production network services. When upgrading a production version of a service to a newer version, testing is typically performed to ensure that changes implemented in the new version do not unexpectedly break existing behavior of the production version. However, in large scale software systems, such regression testing can pose significant challenges.

One example of a large-scale software system that is extremely difficult to regression test is a reverse proxy service, which may be implemented as part of a multi-tenant infrastructure provider network. In such a reverse proxy service, fleets of reverse proxy nodes are deployed across regional data centers of a wide area network to receive incoming Internet traffic and forward the traffic to backend services. The proxy service may be used to support a large number of tenant services hosted in the infrastructure provider network, each with a different set of functional requirements for the proxy service. As such, the proxy service is the target of numerous uncoordinated changes (e.g. untested changes or "quick-fixes"), causing the proxy service to become a piece of highly coupled and sparsely documented software with functional impacts across thousands of product teams.

As may be appreciated, proper regression testing of such a service is virtually impossible. Developers making changes to the service can have little confidence that the changes will not break critical service features or create undesired behavior. Even if new tests are diligently created for new features, the tests are difficult to maintain and use. For example, test cases created during a development phase are not necessarily made accessible to service operators to monitor and diagnose the network service after its deployment. As another example, there is no easy way to identify test cases for obsolete service behavior that should be deprecated.

To address these and other challenges in current software testing systems and improve the functioning of such systems, this disclosure describes embodiments of an adaptive testing service (ATS) that automatically generates and deprecates test cases for testing network services based on observed behaviors of the network service.

In some embodiments, the ATS collects telemetry data about the network service from production environment(s). The telemetry data may include request logs, performance metrics, packet dumps, etc. The telemetry data is filtered and analyzed based on clustering and/or classification algorithms to automatically identify classes of observed behaviors of the network service. The derivation of service behaviors in this manner effectively reverse engineers the functionality of a network service without relying on prior knowledge or documentation of the service.

In some embodiments, the telemetry data is collected from multiple production environments where the network service is run (e.g. multiple geographic regions, fabrics, or domains). The ATS strips environment-specific variables from the telemetry data so that the data is generalized into a set of environment-neutral behaviors. The behaviors are then augmented with environment variables to generate a set of environment-specific test cases that are executable in all production environments.

In some embodiments, the environment-specific test cases are used to monitor the production behavior of the network service, for example, to detect behavior changes in the service over successive time periods, or identify differences in the behavior of the network service across production environments. In some embodiments, the results of the test cases may be analyzed as additional telemetry data to continuously refine the test cases, for example, to add new test cases for newly observed behaviors or adapt to changes in the service behavior.

In some embodiments, the ATS extracts frequency and recency information about identified behaviors from the telemetry data, which are then used to determine a weight for individual test cases. The test case weight may be an indication of the importance of the test case. A higher weight may cause a particular test to be run more frequently or strictly, while a lower weight may cause a test to be relaxed or even deprecated. In some embodiments, the generated test cases and their weights are persisted in a test case repository, which can be accessed from both production and development environments.

In some embodiments, the test cases in the repository are used in a development environment to perform regression testing on changes made to a development version of the network service. A regression test may isolate an observed behavior change to a particular code change. In some embodiments, how a test case failure is handled by the testing system (e.g. whether a behavior-changing code update is accepted or rejected) is controlled by the test case weight. Moreover, the test cases may be automatically updated by the ATS during the development process. For example, newly observed behaviors that are intentional results of developmental changes can be recorded and converted into new test cases. The test case weights can also be dynamically adjusted based on observations collected during the development process.

In some embodiments, the test cases in the repository may be continuously updated based on both the production telemetry data collected from the production environment and developmental changes occurring in the development environment. In some embodiments, the repository may store distinct sets of test cases for the production version of the network service and the development version of the network service. However, changes in one set of test cases may be propagated to the other set. In this way, the ATS maintains two separate "forks" of the test cases that can evolve independently with the two versions of the network service.

In some embodiments, the test cases are generated in a behavior specification language that expresses testable behaviors in a human-readable or natural language (e.g. English or French). In some embodiments, a behavior specification specifies test preconditions, test actions, and expected test results of a tested behavior. A test case specified in the behavior specification language can be automatically parsed and executed by testing automation tools. The behavior specification language also allows a descriptive name to be specified for each test case, which may be generated programmatically by the ATS based on the contents of the behavior specification.

Embodiments of the ATS may provide a number of user interfaces (e.g. web-based portals or other graphical user interfaces) to expose functionality to users. In some embodiments, a monitoring GUI is provided that allows users to define a monitoring process using generated test cases and view the results of test cases during the monitoring process. The monitoring GUI can provide information such as what test cases are included in the monitoring process, the results of the last execution of the tests, and historical results of previous executions of the tests. The test results may be broken down into different OSI layers or network protocols. For example, the GUI may display separate performance metrics for networking protocols such as TCP, IP, DNS, HTTP, and SSL/TLS.

In some embodiments, the ATS provides a search GUI (or command line interface) that allows users to search for test cases in the test case repository. The searching may be performed using a query language such as SQL or PARTIQL, based on the data schema of the test case repository. Moreover, the search GUI may allow users to launch individual test cases on selected environment(s) to simulate network requests, etc.

In some embodiments, test cases in the repository are accessible via developer interfaces such as a code change review GUI. The code change review GUI may report the results of regression testing, for example, an indication that a code change caused a change in a preexisting behavior of the network service. The indication may include information such as how the observed behavior deviated from the expected behavior, and when the expected behavior was last observed, etc. The code change review GUI may also allow users to accept or reject code changes, modify the test case(s), or automate any such user actions.

As will be appreciated by those skilled in the art, embodiments of the techniques described herein are used to implement a specialized computer system that improves the functioning of current software testing systems. The techniques are directed to performing computer-specific tasks that arise from computer systems, including generation and deprecation test cases for testing software. Various aspects of techniques, as will be described further below, are designed to achieve specific technical benefits in the computer system. For example, the ATS generates new test cases based on machine-generated telemetry data so that the test cases can be programmatically adapted to the actual behavior of the network service. In some embodiments, the test case generation process involves performing machine learning tasks such as data classification and clustering, which are necessarily executed by machines and not practically performed by humans. As another example, the test cases themselves are designed to be executable by computers, and certain processes automated by the ATS (e.g. the monitoring of production service environments) are necessarily computer processes. As such, the disclosed techniques represent practical applications of computer technology to solve technical problems that arise in real-world computer systems, and not intended to capture any abstract concepts such as bare mathematical formulas/relationships, human mental or pen-and-paper processes, methods of organizing human activity such as fundamental economic practices, or any other types of exceptions to patent-eligible subject matter recognized by the courts. These and other features and advantages of the disclosed techniques are discussed in further detail below, in connection with the figures.

FIG. 1 illustrates an adaptive testing service 100 capable of automatically generating and deprecating test cases to maintain test coverage over observed behaviors of a network service, according to some embodiments.

As shown, FIG. 1 depicts an embodiment of the ATS 100, which may be implemented by one or more computer systems that execute specialized software programs. As shown, the ATS is configured to manage a set of test cases 140 for testing a network service through two cyclical processes. The top cycle occurs in a production environment 110 with respect to a production version 112 a network service, and the bottom cycle occurs in a development environment 160 with respect to a development version 162 of the network service.

It is noted that the development version 162 of the network service does not necessarily originate from the production version 112. That is, the development version 162 is not necessarily a modification of the codebase of the production version 112. Rather, the development version 162 and the production version 112 may be two distinct software systems that implement some common testable features.

As shown, in the top cycle, the ATS collects 114 telemetry data 120 from the production version 112 of the network service. The telemetry data 120 may include different types of observations about the execution of the network service 112. Depending on the embodiment, the telemetry data may include activity data such as HTTP request logs, DNS query logs, connection records, IP flow logs, packet dumps, etc. In some embodiments, the telemetry data may include performance metrics about the network service such as latencies, network traffic volumes, CPU utilization levels or worker node counts, etc. In some embodiments, the telemetry data 120 may include the results of test probes, which may be synthetic service requests generated by the testing service 100. In some embodiments, the telemetry data 120 may also include environmental variables at the time that the activity data was captured, such as the time of the day, the state of the network service 112, etc. The collection 114 may be performed using agents deployed in the network service 112 or in an agentless manner. Data collection agents may be configured to report telemetry data to the ATS 100 in periodic batches.

As shown, the telemetry data 120 is analyzed to derive 122 observed behaviors and associated frequency and recency information about the behaviors 130. In some embodiments, to reduce the amount of telemetry data that is processed, the ATS may perform one or more filtering or deduplicating steps on the collected telemetry. For example, embodiments of the ATS may randomly sample the collected data to create smaller datasets for further analysis.

In some embodiments, the analysis of the telemetry may group the telemetry into distinct classes of behaviors. This grouping may be defined through user configuration (e.g. corresponding to different types of service requests), or determined automatically through machine-learned algorithms such as clustering or classification. For example, an unsupervised machine learning algorithm may be used to identify groups of similar service requests seen by the network service 112, with minor variations. In some embodiments, the machine learning models used to perform the clustering or classification may be continuously or periodically updated through human feedback or active learning.

In some embodiments, the observation frequency and recency information of the behavior classes are extracted from the telemetry data 120. The information may be extracted as different types of statistical measures such as simple counts (e.g. count per observation interval), quantiles, min/max levels, averages, distributions, etc. The observed frequency and recency statistics for each behavior class may be used to assign a weight to the generated test case for the behavior class.

In some embodiments, the observed behaviors and frequency/recency information 130 may be stored in the test case repository 150, which may be a database system that implements a specific data schema for the behavior data. The test case repository 150 may support a form of query language such as SQL or PARTIQL. In some embodiments, the behavior data 130 and the ultimate test cases 140 may be stored under a common schema or data format.

As shown, the observed behaviors and frequency/recency information 130 is used by the ATS to generate 132 a test case set 140 for the production version of the network service 112. The test case set 140 is persisted in the test case repository 150 and may include a variety of test types, such as connectivity tests, performance tests, behavior verification for different portions of the network service, and network packet content analysis. In some embodiments, the test case set 140 may include both test cases that are auto-generated by the ATS 100 and test cases that are manually created by human testers.

In some embodiments, the test cases 140 may be generated in a behavior specification language that describes the tested behaviors (e.g. test actions and expected outcomes) in a human-readable or natural language (e.g. English). At the same time, the behavior specification language can be programmatically parsed and executed by automated testing tools. In some embodiments, the ATS may also generate a descriptive name for each test case in the natural language that describes the behavior being tested by the test case. The descriptive name is generated based on the behavior specified in the test case, and may be generated based on programmed rules, heuristics, or machine learning techniques.

In some embodiments, the ATS 100 may collect telemetry data 120 of multiple instances of the network service 112 running in multiple production environments 110 (e.g. multiple data centers located around the world). In such embodiments, the behavior derivation step 122 may initially remove environment-specific variables from the telemetry data (e.g. environment-specific domain names and IP addresses) to generate a set of environment-neutral behaviors 130. The test case generation step 132 will then add environment-specific variables back to the environment-neural behaviors to generate test cases that are executable in all production environments. In some embodiments, the ATS will generate a test case set 140 that contains the same test cases for all production environments, although the weights of the test cases are allowed to vary depending on the environment.

In some embodiments, the test case generation step 132 may augment the observed behaviors by randomly varying parameters of the behaviors (e.g. certain input or environmental variables). The augmentation of test cases in this manner enables the testing system to discover nuances in the behavior of the network service that may be missing from the collected telemetry data. The amount of augmentation may be controlled by configuration and depend on the observed frequency/recency metrics of the behaviors.

As shown, once the test case set 140 is generated, the ATS executes 142 the test cases to continuously monitor the production version of the network service 112, for example, by repeatedly executing the tests at fixed intervals. This monitoring may be performed to ensure that the expected behaviors of the network service does not change over time, or that the service's behaviors are the same across multiple production environments. If certain a tested condition fails during the monitoring, an alarm may be issued to the network operator. In some embodiments, individual tests in the test case set 140 may be launched by network operators on an ad hoc basis to diagnose specific issues in the network service.

In some embodiments, the results of the test case executions 142 may be used to generate additional telemetry data that are again collected 114 by the ATS. This additional telemetry data may be used to discover additional behaviors (or update known behaviors) of the network service, so that the test case set 140 will evolve over time to adapt to behavior drifts in the network service. For example, the weights of the test cases may be adjusted over time as certain features of the network service become less used. If a service feature falls below a minimal usage or weight threshold for a certain period of time, it may be deprecated from the test case set altogether.

As shown, the bottom cycle occurs in a development environment 160 where a development version of the network service 162 is being continuously changed through developer code changes 170. Code changes 170 may include not only change in the executable software of the networks service, but also changes in the service configuration data such as infrastructure configuration data (e.g. network topology or load balancer policy), application-level control data (e.g. permissions attached to a service resource or role), or environment variables (e.g. a DNS entry used by the service). In some embodiments, the developer environment 160 may implement a software testing system that is distinct from the production environment 160. However, the software testing system can access the test cases 140 stored in the test case repository 150, including test case 180. Advantageously, the top cycle in the production environment automatically generates test cases with appropriate coverage for the features of the network service, so that developers do not have to manually create these test cases.

As shown, in this example, the test case 180 includes the test action(s) and expected behavior(s) 182 of the test. As discussed, this portion of the test case 180 may be specified in a natural language format and be machine executable to run the test case. However, the test case may be associated with additional metadata in the test case repository 150. For example, test case metadata may indicate specific code module(s) associated with the test case 180. This information may be specified by developers as they add code components to the network service or automatically discovered by the testing service when a code change causes a failure of the test case.

As shown, the test case metadata also includes the test case weight 184 which, as discussed, may be determined based on the observed frequency/recency of tested behavior in the production environment 110. The weight may be used to indicate a relative importance of the test case 180, and in some embodiments, a high weight value may be assigned when the observed frequency is very high (common behavior) or low (rare behavior). In some embodiments, behaviors that have been last observed more recently are assigned a higher weight, while behaviors that have not been observed recently are assigned a lower weight. In some embodiments, the weight 184 may depend on factors other than the observed frequency/recency, such as observations of how the test case is used during development testing. For example, a test case that is often ignored by developers may be reduced in weight. In some embodiments, the test case repository may maintain different weights for a test case 180 in different environments (e.g. environments 110 and 160). In some embodiments, the test case weight 184 may comprise multiple weight metrics that reflect different properties of a test case.

As shown, the test case metadata may include additional information. For example, the metadata may indicate when the tested behavior was last seen 188 (e.g. when the test case 180 was last observed to pass during regression testing) or when the behavior stopped (e.g. when the test case last failed). The test case metadata may also include historical data 189 about the test case, which may include the history of test results associated with the test case, or the history of changes to the test case (e.g. weight changes or test definition changes).

In some embodiments, as a code change 170 is received during the development process, the ATS may execute 172 a set of regression tests on the changed version of the network service, including test case 180. The regression testing may be repeated in an automated manner by the ATS, for example, as part of a nightly rebuild process or a periodic code review.

As a result of the testing, the ATS identifies a change in the behavior tested by the test case 180, and associates the behavior change to the particular code changes 170. In some embodiments, when a behavior change is detected, the test case 180 is deemed to fail. The failure may be presented to the developer (e.g. via a user interface) to assess whether the code change should be accepted or denied 180 in light of the behavior change. The developer may supply feedback regarding the test failure, such as whether the behavior change is expected and/or desired. For example, a behavior change may be part of an intentional feature change of the network service. Depending on the developer feedback, the testing system will accept or deny 180 the code change 170 (e.g. either commit the code change or roll back the change).

In some embodiments, the accept or deny decision 180 may be made autonomously by the ATS without any developer feedback. For example, the testing system may automatically ignore a test case failure based on its test case weight 180. As another example, the testing system may choose to automatically reject a code change 170 if the test case weight 180 is above a certain threshold. In some embodiments, the accept or deny decision 180 is left to the developer, but the testing system will make a recommendation to the user based on the test case weight 184.

As shown, once the code change 170 is accepted or rejected, the ATS may make certain changes 190 to update 192 the test case 180. For example, the weight 184 of the test case may be decreased if the developer chooses to ignore a test failure. In some embodiments, if the weight of a test case falls below a threshold for a certain period of time, the testing system will automatically deprecate 194 the test case so that it is no longer used for further regression testing (or deleted altogether). As another example, if the developer indicates that the changed behavior is intentional and/or desired, the testing system may update the test case with the new behavior, so that the new behavior will become the correct behavior of the network service.

As with the production environment process cycle, the development environment process cycle may be repeated continuously. In the development context, the test cases 140 are evolved based on code changes and developer feedback to adapt the test case set to the development version of the network service. In some embodiments, when the network service ultimately migrates or switches to the development version, the test case set used to regression test the development version can be automatically converted to perform production monitoring. Thus, the ATS can drastically reduce the amount of testing effort and risks associated with a version upgrade, allowing new versions of the network service to be deployed quickly and seamlessly.

Figure 2:
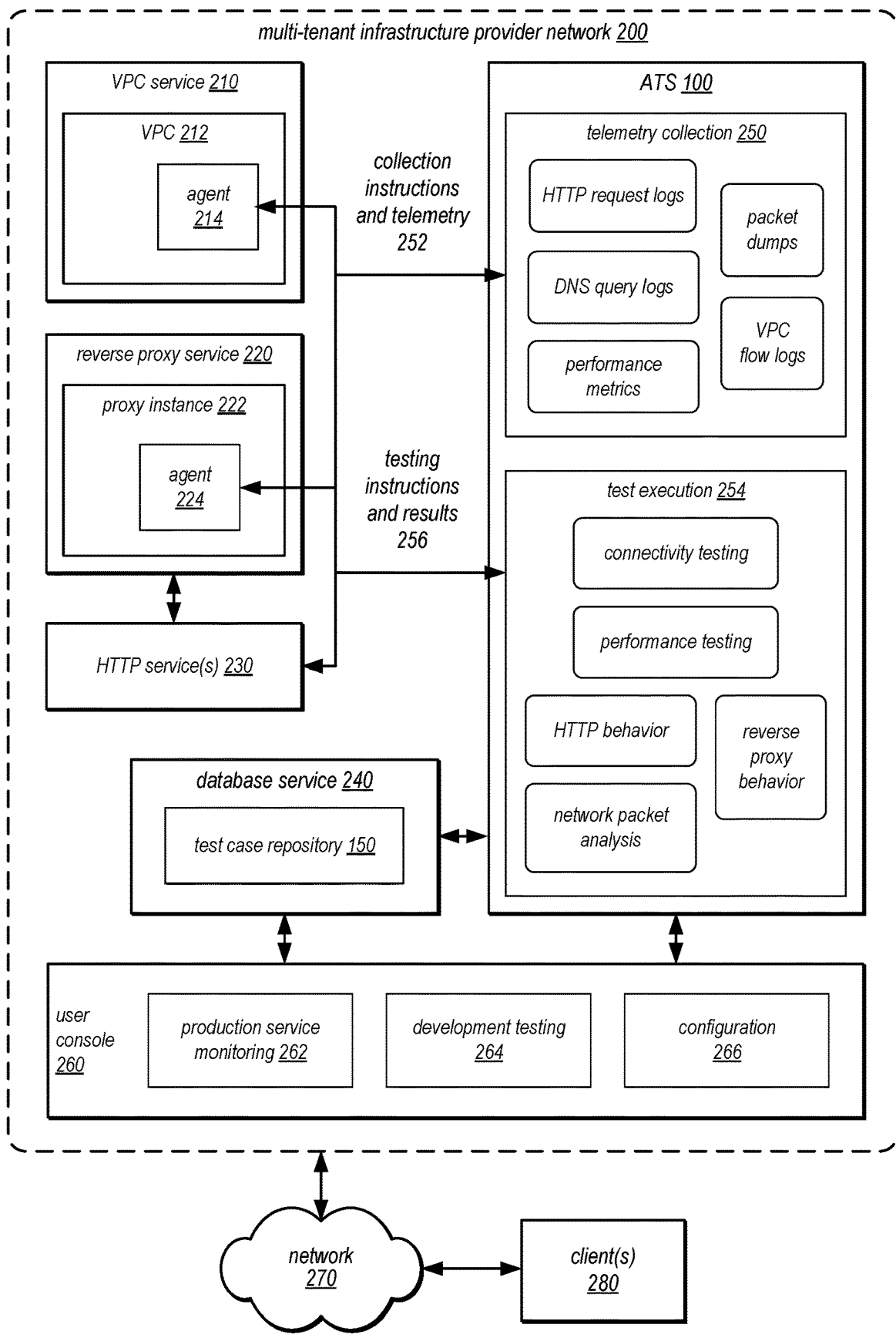
FIG. 2 illustrates a multi-tenant infrastructure provider network that implements the ATS for multiple types of network services in the provider network, according to some embodiments.

FIG. 2 illustrates a multi-tenant infrastructure provider network 200 that implements the ATS 100 for multiple types of network services in the provider network, according to some embodiments.

The depicted multi-tenant infrastructure provider network 200 may be a private or closed system, which may be set up by an entity such as a company or a public sector organization to provide one or more services (such as various types of cloud-based storage) accessible via the Internet and/or other networks to clients 280 in client premises networks, in some embodiments. The provider network 200 may be implemented in a single location or may include multiple geographically distributed data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service 210, a reverse proxy service 220, HTTP services 230, a database service 240, the adaptive testing service 100, and a user console 260.

In some embodiments, the VPC service 210 may be implemented by provider network 200 to offer compute instances (e.g. virtual machine instances managed by a hypervisor) according to various configurations for client operations. The compute instances may be launched based on a stored image that contains the desired software stack to act as compute nodes in client applications. The compute resources may then be deprovisioned (e.g. returned to a warm pool) when the request is handled. Depending on the embodiment, the provider network will handle resource management tasks such as capacity planning, configuration, fault recovery, and scaling, and relieve the clients of the service from having to manage such details.

To implement the VPC service 210, the provider network 200 may implement a physical or substrate network (e.g., sheet metal boxes, cables, rack hardware) referred to as the substrate. The substrate network can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service 210 may implement one or more client networks (e.g. VPC 212) as overlay networks of virtualized computing resources (e.g., compute instances provided by the compute service(s), block store volumes, data objects such as snapshots and machine images, file storage, databases provided by the database or data storage service(s)) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, the reverse proxy service 220 is a service that provides compute nodes (e.g. proxy instance 222) at the edge of the provider network 200 to act as frontends to backend services hosted within the provider network. For example, the reverse proxy service 220 may be configured to present a public service interface for a backend service (e.g. a public domain name or network address) to service clients outside the provider network, and respond to client requests as if the responses were generated from the public domain name or network address. In some embodiments, the reverse proxy service 220 may provide an HTTP frontend using a fleet of web servers, which can be used to support backend HTTP services 230. In some embodiments, the reverse proxy service 220 may be configured for web-based content delivery services. In some embodiments, the reverse proxy service 220 may support a specialized API or web service protocol to implement an API gateway for a backend service. The reverse proxy service 220 may be configured perform a wide range of functions such as client connection maintenance, request routing, address translation, load balancing, request throttling, security policy enforcement, metrics logging and reporting, among other tasks.

In various embodiments, the database service 240 can perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in some embodiments, database service 240 may include various types of data access capabilities (e.g., SQL or PARTIQL) for storing, querying, and updating data. Such services may be enterprise-class database systems that are scalable and extensible. Queries may be directed to a database in database service 240 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via APIs. In some embodiments, database service 240 may be capable of storing data that is not stored in fully structured storage (e.g., non-relational or document databases). The database service 240 may access the data that is semi-structured or not-structured in storage, such as data objects of unstructured or semi-structured data in a separate data storage service. In some embodiments, the database service 240 may store the generated test cases 140 as JSON documents.

As shown, embodiments of the ATS 100 may be implemented as part of a unified network observability or testing platform that can perform a variety of tests for a variety of network services. The ATS may implement control modules such as telemetry collection 250 and test execution 254, which are configured to communicate with and to control agents (e.g. agents 214 and 224) deployed in various services of the provider network. The agents may take different forms depending on the setting. For example, agent 214 may be implemented as a virtual machine instance within the VPC 212, and agent 224 may be implemented as a container instance or background process on the proxy instance 222. The telemetry collection component 250 and test execution component 254 may execute as part of the control plane of the ATS, while the actual testing and data collection are performed in the data plane of the ATS. In some embodiments, the control plane may be responsible for deploying and terminating the agents.

The telemetry collection component 250 is responsible for controlling telemetry collection from the network services by sending collection instructions and receiving telemetry data 252. In some embodiments, the collection agents 214 and 224 may be pre-configured with data collection instructions (e.g. a collection schedule), but such instructions can be updated over time based on further instructions from the telemetry control module 250. As shown, the telemetry collection module 250 may be capable of managing different types of telemetry collections including HTTP request logs, DNS query logs, packet dumps, performance metrics, and VPC flow logs, etc.

The test execution component 254 will manage testing of the network services by sending testing instructions and receiving test results 256. Tests may be performed on a scheduled basis or in response to an event or user command. The tests may be executed by the agents 214 and 224. For example, the agents may be instructed by the text execution component 254 to generate synthetic client requests to elicit responses from the tested service. As shown, the test execution component 254 may be configured to control different types of testing including connectivity testing, performance testing, HTTP behavior testing, reverse proxy behavior testing, and network packet analysis, etc. Individual tests will be performed according to the test cases stored in the test case repository 150, which act as contracts between the text execution component 254 and the agents.

In some embodiments, the connectivity testing involves probing the network service to verify the connection status of certain network connections between service components. A connectivity test may be performed via agent probes, which may be implemented by a virtual machine instance or a serverless function. The agent may be configured to check the connections in the network service periodically according to a schedule or in response to certain event triggers (e.g. when new resources are deployed). In some embodiments, an agent is provided with a configuration file with a list of endpoints to be pinged.

In some embodiments, reverse proxy behavior testing involves capturing a "traffic quad" associated with individual reverse proxy nodes, which includes log data associated with a incoming request from a client received by the proxy node (RequestIn), an outgoing request generated by the proxy node to the backend service (RequestOut), an incoming response received by the proxy node from the back end service (ResopnseIn), and an outgoing response send by the proxy node to the client (ResponseOut). In some embodiments, the traffic quad may be captured as HTTP logs, and a collection agent executing on the proxy node will periodically send the log data to the ATS. In some embodiments, performance metrics of the proxy node may be sent to a metrics watch service of the provider network 100 which is monitored by the ATS. In some embodiments, the network traffic received by the proxy node may be forwarded to the ATS via a real time data stream so that the ATS can take certain real time actions on the network traffic.

In some embodiments, the infrastructure provider network 200 may implement a user console 260, which may be a web-based graphical user interface that allows users to configure and control the functions of services provided by the provider network. For example, various operational aspects of the ATS 100 may be controlled via a configuration interface 266 exposed via the user console 260. In some embodiments, the user console 260 may also be used to implement other user interfaces associated with the ATS, such as a production service monitoring interface 262 for monitoring production versions of the network services, and a development testing interface 264 for testing development versions of the network services. As discussed, these user interfaces 262 and 264 may be used to access the test cases in the test case repository 150 to perform various testing of the network services. In some embodiments, the functionality of the user interfaces 262, 264, and 266 may also be exposed via a programmatic interface (e.g. a service API) of the ATS.

Generally speaking, the clients 280 may encompass any type of client configurable to submit network-based requests to provider network 200 via network 270. For example, a given client 280 may include a suitable version of a web browser, or may include a plug-in module or other type of code module that may execute as an extension to or within an execution environment provided by a web browser. A client 280 may encompass an application such as a database application, a media application that consumes digital content, an office application or any other application that may make use of resources in the provider network 200 to implement various features, systems, or applications. In some embodiments, such an application may include sufficient protocol support (e.g., for a suitable version of Hypertext Transfer Protocol (HTTP)) for generating and processing network-based services requests without necessarily implementing full browser support for all types of network-based data.

The clients 280 may convey network-based services requests to and receive responses from provider network 200 via one or more network(s) 270. In various embodiments, network 270 may encompass any suitable combination of networking hardware and protocols necessary to establish network-based-based communications between clients 280 and provider network 200. For example, network 270 may generally encompass the various telecommunications networks and service providers that collectively implement the Internet. Network 270 may also include private networks such as local area networks (LANs) or wide area networks (WANs) as well as public or private wireless networks. For example, a given client 280 and provider network 200 may be respectively provisioned within enterprises having their own internal networks. In such an embodiment, network 270 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 280 may communicate with provider network 200 using a private network rather than the public Internet.

FIG. 3 illustrates a telemetry log record 310 that is used by the ATS to generate test cases, according to some embodiments.

As shown in this example, the telemetry log record 310 includes an HTTP request 320 and response 330. The request and response may be part of a HTTP traffic quad collected from a reverse proxy node, as discussed. As shown, the request portion 320 of the log record 310 captures a variety of information about the HTTP request, such as the version of HTTP used, the request verb (here GET), the fully qualified domain name of the request, the port of the request, and various header values indicated in the request. The response portion 330 of the log record 310 captures information such as the response status code and reason, and various header values of the HTTP response. Some of the response headers may indicate summary information about the body of the response, such as content type, content length, and content hash. In some embodiments, HTTP log records such as shown in the figure may be captured in the HTTP ABNF (Augmented Backus-Naur Form) specified in the RFC 2616, RFC 7230, and/or RFC 9112 standards. As discussed, this telemetry data will be gathered, stored, and used by the ATS to extract a class of behavior of the reverse proxy node (e.g. for this particular type of GET request), which will be converted into an executable test case for the type of request.

Figure 4:
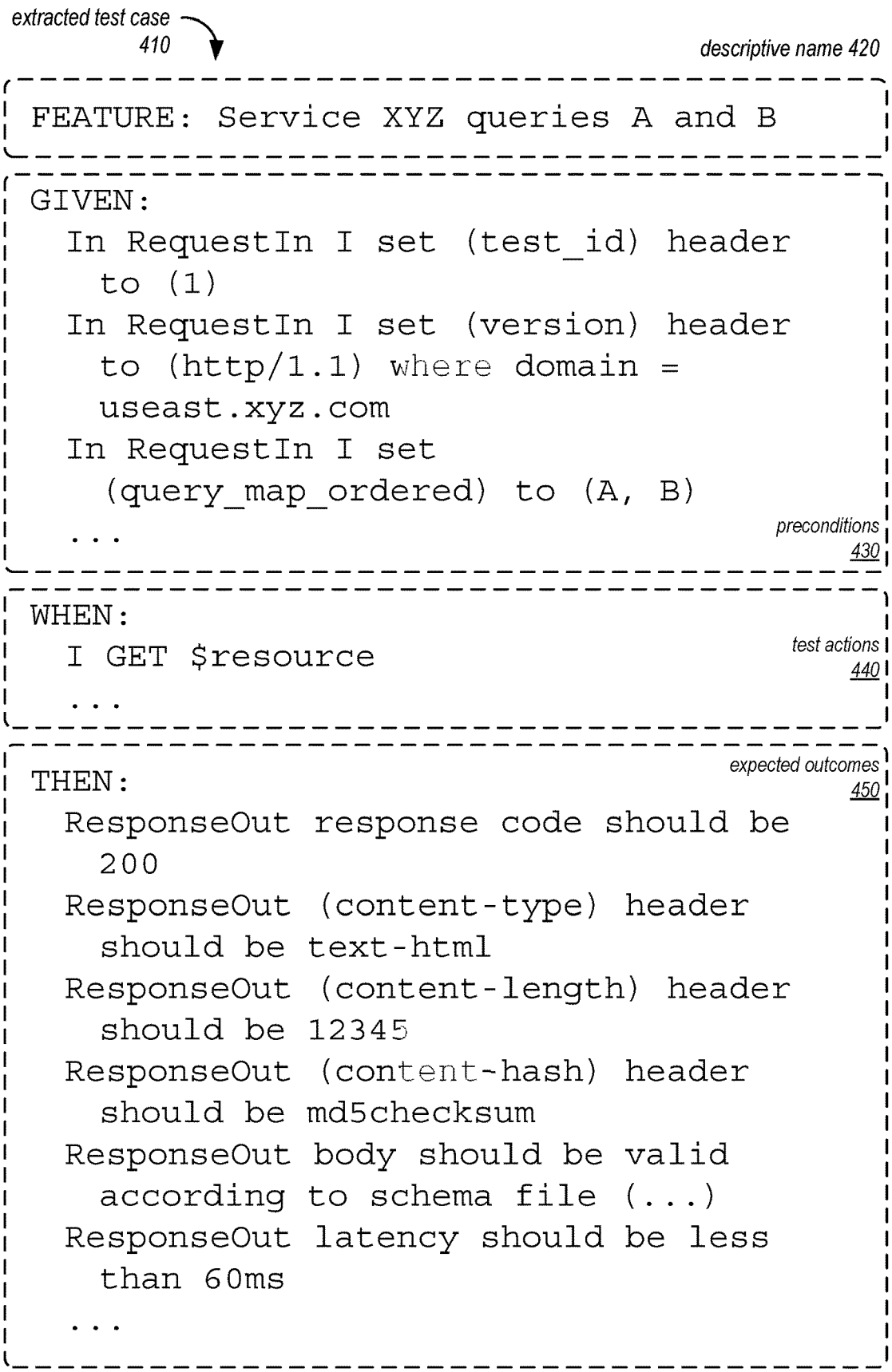
FIG. 4 illustrates a test case generated by the ATS that uses a natural language syntax, according to some embodiments.

FIG. 4 illustrates a test case 410 generated by the ATS that uses a natural language syntax, according to some embodiments.

In some embodiments, the test case 410 may be stored as or provided to users in a human-readable natural language format, where tested behavior of the test case is expressed in a natural language. As shown, the behavior specification includes a preconditions section 430, a test actions section 440, and an expected outcomes section 450. The precondition section 430 is denoted by the "GIVEN" keyword and includes executable steps that are carried out before the simulated user interactions with the system under testing. Note that in this example, the test case sets a test_id header value to 1. In some embodiments, such as header value may be set to segregate test requests from real requests seen by the network service. The test actions section 440 is denoted by the "WHEN" keyword and defines actions performed by the simulated user. Finally, the outcomes section 450 is denoted by the "THEN" keyword that defines the expected outcomes produced by the system as a result of the user actions. These expected outcomes will be programmatically verified during test execution.

In this behavior specification language, the testing steps are expressed in the English language (e.g., In RequestIn I set (test_id) header to (1)). This syntax allows the behavior to be easily understood by humans, including non-programmers. Accordingly, the generated test case can serve as human-readable documentation of the tested behavior. At the same time, the behavior specification language employs a structured syntax that can be programmatically parsed and executed by software. Thus, the generated test case 410 is also machine executable by the testing system. In some embodiments, the test case is generated in the GHERKIN language format, as a CUCUMBER behavior definition.

In some embodiments, a behavior may first be generated as an environment-neutral behavior without environment-specific variables. An environment-specific test case may then be generated by adding environment-specific variables to the behavior (e.g. the environment-specific domain name useast.xyz.com). In some embodiments, the environment-specific values may be defined by an environment specification configuration file, which will define the environment-specific variable values for all testing environments. The ATS may implement an environment transform component that uses the configuration file to transform the environment-neutral behavior to one or more environment-specific test cases when execution of the test cases(s) is requested.

As shown, the test case 410 in this example also includes a descriptive name 420, which is again generated in the natural language. The descriptive name 420 may be generated from other information in the test case (e.g. the preconditions 430, test actions 440, and expected outcomes 450), to provide a human-friendly summary of the test case. Depending on the embodiment, the descriptive name 420 may be generated according to configured rules, heuristics learned over time, or machine learning models such as natural language processing (NLP) models. For example, the ATS may employ an active learning technique to observe how users adjust the descriptive names generated by the system and gradually learn to generate the names in ways that users prefer.

Figure 5:
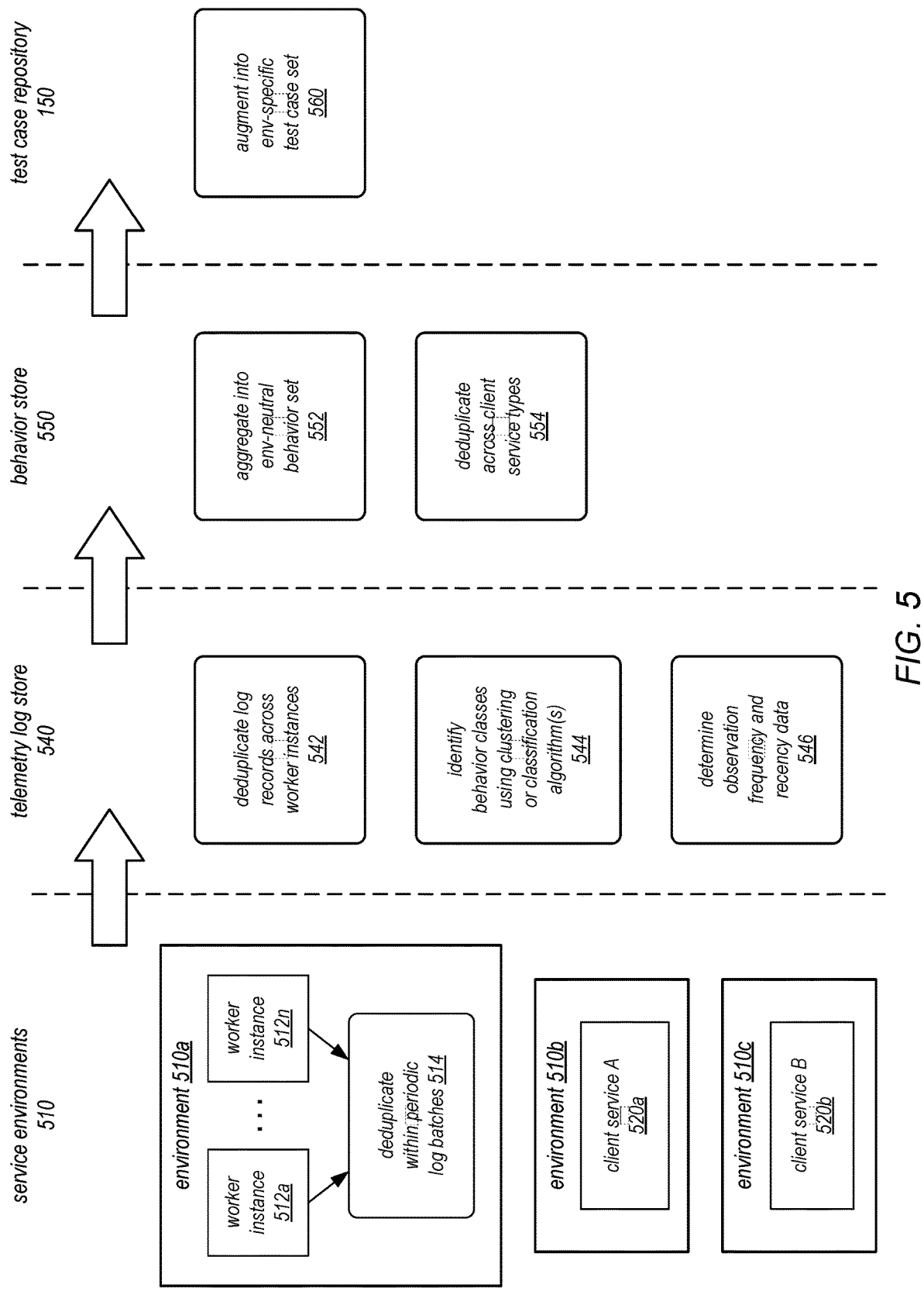
FIG. 5 illustrates a test case set generation process of the ATS that uses a series of data deduplication steps, according to some embodiments.

FIG. 5 illustrates a test case set generation process of the ATS 100 that uses a series of data deduplication steps, according to some embodiments. As may be appreciated, for a large-scale network service, the amount of telemetry data generated by the service can be extremely high. To cope with the volume of telemetry, a number of data deduplication steps are implemented at different points in the test case process to reduce the amount of data that is handled in the generation pipeline.

As shown in this example, the telemetry data used to generate the test cases is collected from multiple service environments 510*a-c*. The generation process involves several stages that store data in different data stores, including a telemetry log store 540, a behavior store 550, and finally the test case repository 150. These data stores may all be implemented by the database service 240 of FIG. 2. In other embodiments, the telemetry data may be stored as files in a file system or objects in an object-based or key-based data store.

As shown in this example, telemetry data in environment 510*a* is reported by a number of worker instances 512*a-n* (e.g. proxy instances 222 in a reverse proxy service). The telemetry data may be generated as time-sequenced logs, and uploaded to the ATS 100 periodically as batches of log entries. The batches may be uploaded at regular time intervals or when a threshold number of log records have been accumulated. In some embodiments, the worker instances 512*a-n* (or agents on the worker instances) may perform a first deduplication step 514. For example, duplicate log records in each log batch may be collapsed into an aggregate record with aggregated statistics and representative timestamp. As another example, the agent may randomly sample a log batch to upload only a subset of the log records. As a result, the uploaded log batches are reduced in size so that network bandwidth usage can be limited and the testing service will not be overwhelmed. As with all data deduplication steps in the process, the degree of deduplication at this step 514 may be controlled by configuration.

As shown in this example, environments 510*b* and 510*c* are executing two different types of client services that use the network service, service A 520*a* and service B 520*b*. As discussed, in some embodiments, the network service (e.g. a reverse proxy service) is used by many different client services (e.g. backend services of tenants in a provider network). The telemetry collection may gather environmental information about which client service 520 is associated with each telemetry log record so that the ATS can generate test cases with the benefit of this knowledge.

In some embodiments, the raw telemetry logs collected from the service environments 510 are initially stored in the telemetry log store 540. Once in the telemetry log store 540, the ATS may perform another data deduplication step 542 to deduplicate log records across all worker instances. As may be appreciated, for most network services, individual worker instances are generally fungible, and their collective telemetry data can be further deduplicated without losing essential information about the behavior of the network service.

In some embodiments, the behavior classes may be identified 544 from the telemetry data at this stage. The behavior classes may be determined according to rules (e.g. human-specified request types), or based on machine learning algorithms such as clustering or classification. With machine learned classification, a human operator may provide an initial set of labeled classes that correspond to known behaviors of the network service. The classification process may then flag behaviors that do not fit well with any of the known behavior classes, so that the set of behavior classes can be expanded as needed. In some embodiments, the ATS may randomly generate synthetic requests to the network service to probe the network service for new behaviors. Newly discovered behaviors produced by such probing are recorded as new behaviors. In some embodiments, the machine learning techniques and/or models used at this stage are periodically updated based on new data patterns and/or human feedback to optimize these techniques for identifying behavior classes.

In some embodiments, the behavior observation frequency and recency information are also determined 546 at this stage. As discussed, such information may be used to determine a weight or importance metrics for the behavior. The frequency and recency metrics may be individually determined for each environment 510*a-c*, which may exhibit different values for such metrics.

In some embodiments, the ATS will monitor the observed frequency of different behavior classes over time (e.g. with each collection) to watch for changes in the behavior patterns of the network service. For example, this stage of the process may be configured to raise an alarm whenever the observed frequency of a behavior changes drastically. If a high frequency behavior of the network service abruptly stops, this behavior change may indicate a problem in the network service. In some embodiments, such alarms may be logged so that they can be later queried to determine when a behavior change occurred.

As shown, in the next stage of the process, the behaviors extracted from the telemetry data are stored in a behavior store 550. In some embodiments, the behaviors may be stored in a behavior specification language as discussed in connection with FIG. 4. In some embodiments, the extracted behaviors from different environments 510 are aggregated into sets of environment-neutral behaviors 552 by removing any environment-specific variables (domain names, IP address, etc.) from the behaviors. The set of environment-neutral behaviors represents a common set of testable behaviors for a single type of network service. This aggregation step 552 also deduplicates common behaviors of the network service across all environments, which reduces storage requirements of the behavior store 550.

Additionally, in some embodiments, another deduplication step 554 is performed to deduplicate behaviors across multiple client service types (e.g. service types A 520*a* and B 520*b*). This deduplication step 554 is used to further reduce the behavior set across client services 520 of the network service, so that common behaviors shared by different client services can be identified and not tested redundantly.

As shown, the last stage of the process augments the environment-neutral behaviors of the network service into a set of environment-specific test cases that are executable on each of the environments 510. This augmentation may be performed by adding environment-specific variables to the environment neutral behavior specifications. In some embodiments, the adding of environment-specific variables is performed by an environment transform component of the ATS, according to a configuration file. This augmentation step will generate one test case per behavior per environment. In some embodiments, the ATS may not actually store the environment-specific test cases, but only generate these test cases at runtime when testing is requested. In some embodiments, the behavior store 550 and the test case repository 150 is the same data store.

Figure 6:
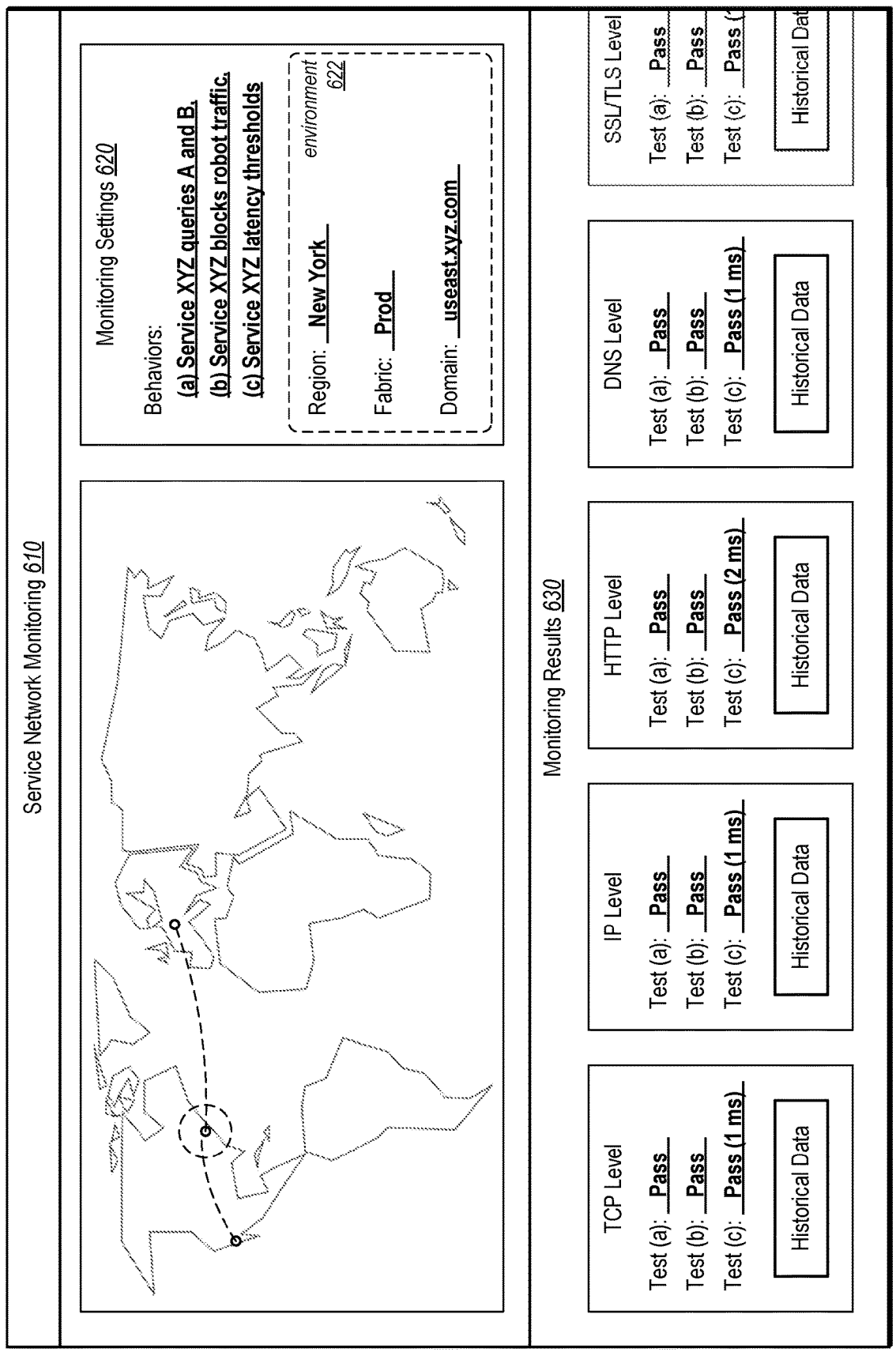
FIG. 6 illustrates a graphical user interface (GUI) for managing the monitoring of the network service using test cases generated by the ATS, according to some embodiments.

FIG. 6 illustrates a graphical user interface 610 for managing the monitoring of the network service using test cases generated by the ATS, according to some embodiments. GUI 610 may be implemented as part of the production service monitoring interface 262 of FIG. 2.

As shown in this example, the GUI 610 allows a user to monitor a network service deployed at multiple production environments around the world. The monitoring may be performed using tests generated by the ATS 100, which are stored in the test case repository 150. The GUI 610 provides a view of the monitoring settings 620 that allow a service administrator/operator to view and/or change the parameters of the monitoring process. In this example, the settings view 620 lists the test cases that are run during the monitoring. The GUI 610 also allows the user to select a particular production environment 662 to view monitoring results 630 specific to that environment. In some embodiments, an individual environment 662 may be defined by a tuple consisting of a geographical region, a fabric (e.g. production or testing), and a domain, which may correspond to a particular client service that uses the network service.

Depending on the embodiment, the settings 620 may expose other types of configuration parameters for the monitoring process. These parameters may specify, among other things, when and how often the test cases are run, how alerts are generated, how (or whether) the monitoring should discover new behaviors from telemetry data, how the weights of the test cases should be adjusted, when alarms should be generated for changes in behaviors patterns of the network service (e.g. when the observed frequency of a behavior rises or falls), when to notify operator(s) when certain behaviors of the network service deviate across the environments, and whether and when to deprecate a test case from the monitoring test case set when the tested behavior disappears over time.

As shown, the monitoring results section 630 of the GUI 610 separates the results of the monitoring into multiple OSI layers or network protocols of the network stack. Such results may be obtained by different components of the test case when testing a particular behavior of the network service. In this example, the monitoring data is shown for the TCP level, the IP level, the HTTP level, the DNS level, and the SSL/TLS level. In some embodiments, the test results 630 allows users to view the historical data associated with a particular part of the result, for example, a time graph of a latency metric observed over recent cycles of the monitoring process, or the pass/fail history of a particular result of the monitoring process. In some embodiments, the GUI 610 also allows an administrator to launch test cases on demand, for example, to diagnose a problem detected by the monitoring process or to answer user questions.

FIG. 7 illustrates a GUI 710 for performing searching and ad hoc execution of test cases generated by the ATS, according to some embodiments. GUI 710 may be implemented as part of either a production service monitoring interface (e.g. interface 262) or a development testing interface (e.g. interface 264).

As shown, the GUI 710 allows users to specify various search parameters to search for test cases in the test case repository 150. The test parameters in this example includes parameters 720 at indicate the particular environment and additional search conditions 730 associated with the test case metadata. In some embodiments, the search conditions may specify specific aspects of the tested behavior of the test cases, such as what is defined by the behavior specification of the test case shown in FIG. 4. The search may be specified in a text-based query language such as SQL or PARTISQL, or in some embodiments, a natural language-based search language. In some embodiments, test case searching may be performed through a command line interface.

As shown, the bottom of the GUI 710 shows search results 740 that are obtained as a result of the search parameters. The search results 740 may indicate the descriptive name of matching test cases found in the test repository, as well as a longer description of the tested behavior, which may be stored as a part of the test case. In this example, the GUI 710 allows the user to view further details of the matched test cases as well as execute individual ones of the matching test cases.

FIG. 8 illustrates a GUI 810 for reviewing code changes to a development version of the network service, according to some embodiments. GUI 810 may be implemented as part of the development testing interface 264 of FIG. 2.

As shown in this example, GUI 810 implements a code change review interface that allows a developer to examine the results of regression testing on various code changes performed on a development version of the network service. In this example, the table in the GUI 810 lists the various code changes 820 made during a development iteration, the regression tests 822 that were performed on behaviors corresponding to the code changes, the results 824 of the tests, an indication of when each test last passed 826, and the test case weight of each of the test 828.

In some embodiments, the association between a code change 820 and a regression test may be determined programmatically, for example, when a particular code change causes a particular behavior change for the first time. In some embodiments, the code-to-behavior associations may be provided by the developer. As shown, elements in the test results table may be provided as hypertext links so that the developer can click on a link to view additional details about the table element. For example, the Fail link under column 824 may be clicked to view the full results of that particular test execution, including how the observed result is different from the expected result specified by the test.

As shown, the review actions section 830 provides user controls that allow the developer to provide feedback regarding the test results and perform different change management actions. In this example, the GUI 810 allows the user to indicate feedback 840 as to whether the behavior change detected by the regression testing is expected (i.e. intentional) and desirable. An intentional change may be one that reflects a deliberate change in the behavior of the software. A desirable change may be a change that is not foreseen by the developer but not considered to be an error or known to cause problematic side effects.

As shown, based on the developer feedback 840 and the weight 828 of the test case, the GUI 810 makes a recommendation 850 as to what change management actions to take. In this case, because the weight of the failed test case is relatively low and the developer indicated that the behavior change is expected and desired, the system recommends that the code change should be accepted. In some embodiments, the system may also recommend that the test weight be reduced or that the test case be deprecated entirely. The recommendation generation may be controlled via system configuration, such as a policy that dictates what actions should be recommended under what circumstances. In some embodiments, the recommendations may be generated by machine learning model(s) that learns developer behavior over time to mimic typical developer actions.

As shown, a list of change management actions is provided as a number of buttons on the right. In this example, the management actions include accepting the code change, rejecting the code change, updating the test case weight (or possibly deprecating the test case), or creating a new test case for the changed behavior that was observed. In some embodiments, some of these change management actions may be automated based on configured policies. For example, if the weight of a failed test is below a minimum threshold, the failure may be automatically ignored for the acceptance/rejection decision. As another example, if the developer repeatedly indicates that failures of a particular test case are undesirable, the system may automatically increase the weight of the test case.

Figure 9:
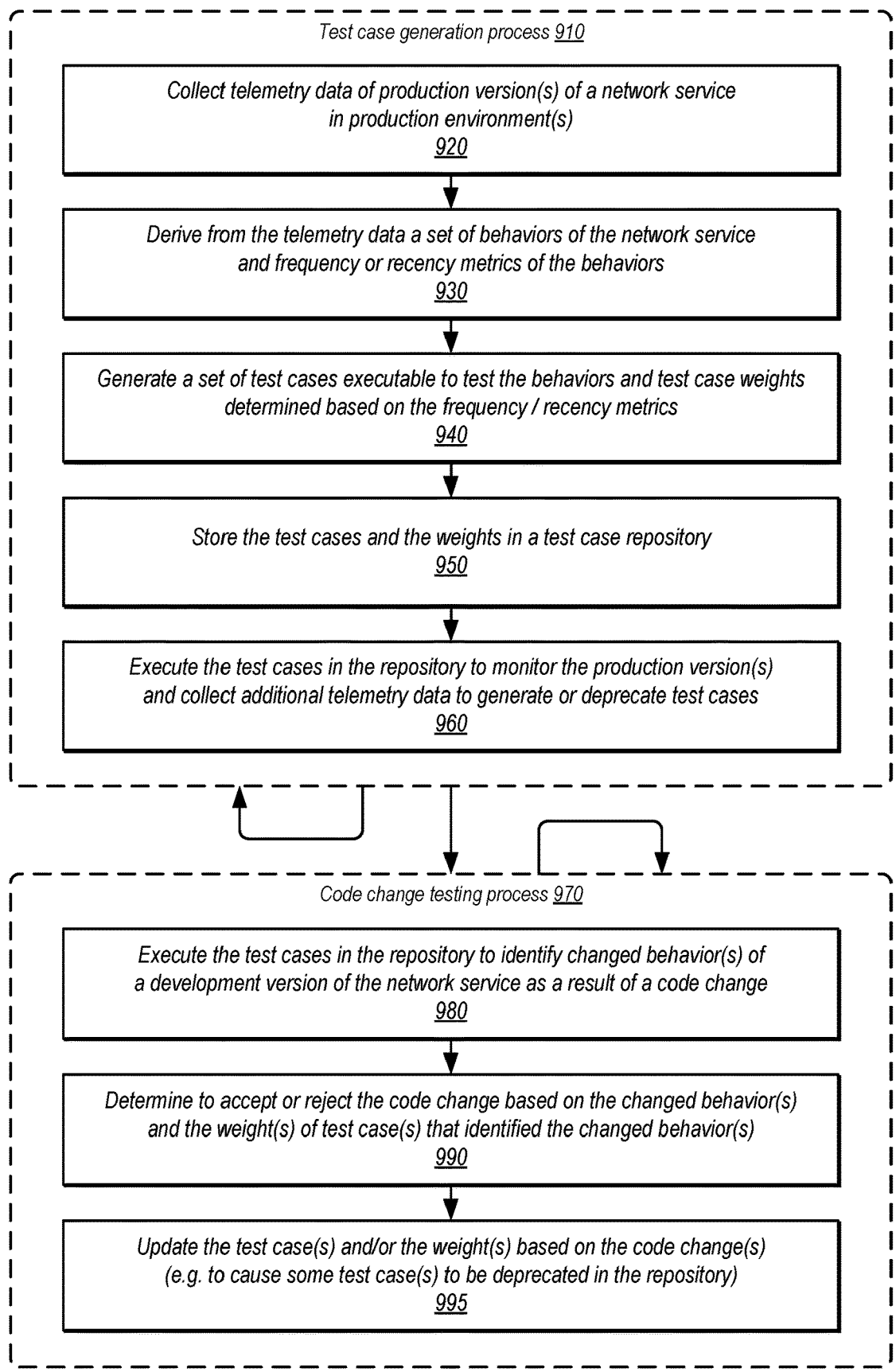
FIG. 9 is a flowchart illustrating a process performed by the ATS to generate and deprecate test cases for a network service, according to some embodiments.

FIG. 9 is a flowchart illustrating a process performed by the ATS 100 to generate and deprecate test cases for a network service, according to some embodiments.

As shown, operations 920 to 960 are performed as part of a test case generation process 910 (e.g. the process depicted in the top portion of FIG. 1). At operation 920, telemetry data (e.g. telemetry data 120) is collected from one or more production version(s) of a network service (e.g. network service 112) executing in one or more production environment(s). The telemetry data may be collected by agents (e.g. agents 214 and 224) deployed in the production environments or in an agentless manner. The telemetry data may include activity logs or performance data about the network service, such as request/response pairs, the quad traffic of a reverse proxy node, packet dumps, VPC flow logs, and various types of environmental data associated with the telemetry data.

At operation 930, the ATS derives from the telemetry data a set of behaviors of the network service, as well as frequency and/or recency metrics associated with the behaviors. In some embodiments, the derivation may be performed using clustering techniques, classification techniques, or machine learning techniques. In some embodiments, the behaviors may be grouped according to human input, such as human specification of different types of services requests. In some embodiments, environment-specific variables may be removed from the behaviors so that the behaviors are environment-neutral. In some embodiments, the behaviors may be generated in a behavior specification language that defines the behavior in a natural language (e.g. as shown in FIG. 4), but is at the same time machine executable.

At operation 940, a set of executable test cases is generated for testing the behaviors of the network service, along with test weights determined from the frequency and/or recency metrics of the behaviors. The test weight may indicate an importance of a test case. For example, a test case that tests a commonly observed behavior or very rarely observed behavior may be assigned a relatively high test weight. The test cases may be generated as environment-specific tests that can be run in specific production environments.

At operation 950, the test cases and their weights are stored in a test case repository (e.g. test case repository 150). In some embodiments, the repository may be a database that permits the test cases to be searched using a query language (e.g. SQL or PARTIQL). In some embodiments, the repository may be accessible from both production and development environments to perform either production testing or developmental testing.

At operation 960, the test cases in the repository are executed to monitor the production version(s) of the network service. The monitoring may be performed repeatedly to watch for undesired behavior changes of the network service over time, or differences in the service behavior across multiple environments. Additionally, results of the monitoring may be collected and used as additional telemetry data that can be used to evolve the test cases to track the behavior of the production environment(s). The evolution may include adding newly discovered test cases, deprecating test cases for behaviors that are no longer observed, or adjusting the weights of certain test cases. The test case generation process 910 may be repeated continuously to adapt the test case set to the production environment(s).

As shown, operations 980 to 995 are performed as part of a code change testing process 970 (e.g. the process depicted in the bottom portion of FIG. 1). At operation 980, the test cases in the repository are executed to identify changed behaviors of a development version of the network service (e.g. network service 162) in a development environment. Such behavior changes may occur as a result of code or configuration changes (e.g. code change 170) made to the development version of the network service. In some embodiments, the test cases are executed repeatedly as part of an ongoing regression testing process.

At operation 990, a determination is made to accept or reject a code change based on the changed behavior(s) and the weight(s) of the test case(s) that identified the changed behavior(s). The code change may be a change in the executable software of the networks service or a change in the service configuration data such as infrastructure configuration data, application-level control data, or environment variables of the service. In some embodiments, this determination may be made automatically by the ATS. For example, if the weight of a failed test case is below a certain threshold, the system may simply ignore the failed test and accept the code change (assuming there are no other failed tests). In some embodiments, the system's acceptance or rejection decision may depend on user feedback about the behavior change (e.g. feedback 840) indicating whether the behavior change is expected or desired. In some embodiments, the code change acceptance or rejection decision may be made manually by the developer, based on a recommendation from the system (e.g. recommendation 850).

At operation 995, the ATS updates test case(s) and/or the weight(s) in the repository based on the code change(s). For example, in some embodiments, a test case weight may be automatically decreased based on developer feedback or an observation that failures of the test case are repeatedly ignored by developers. As another example, when a developer indicates that behavior change is intentional, the system may automatically generate a new test case to document the new behavior and use the new test case to verify the behavior in future testing. As shown, the code change testing process 970 may repeat continuously so that the test cases can maintain testing coverage over the changing behaviors of the development version.

Figure 10:
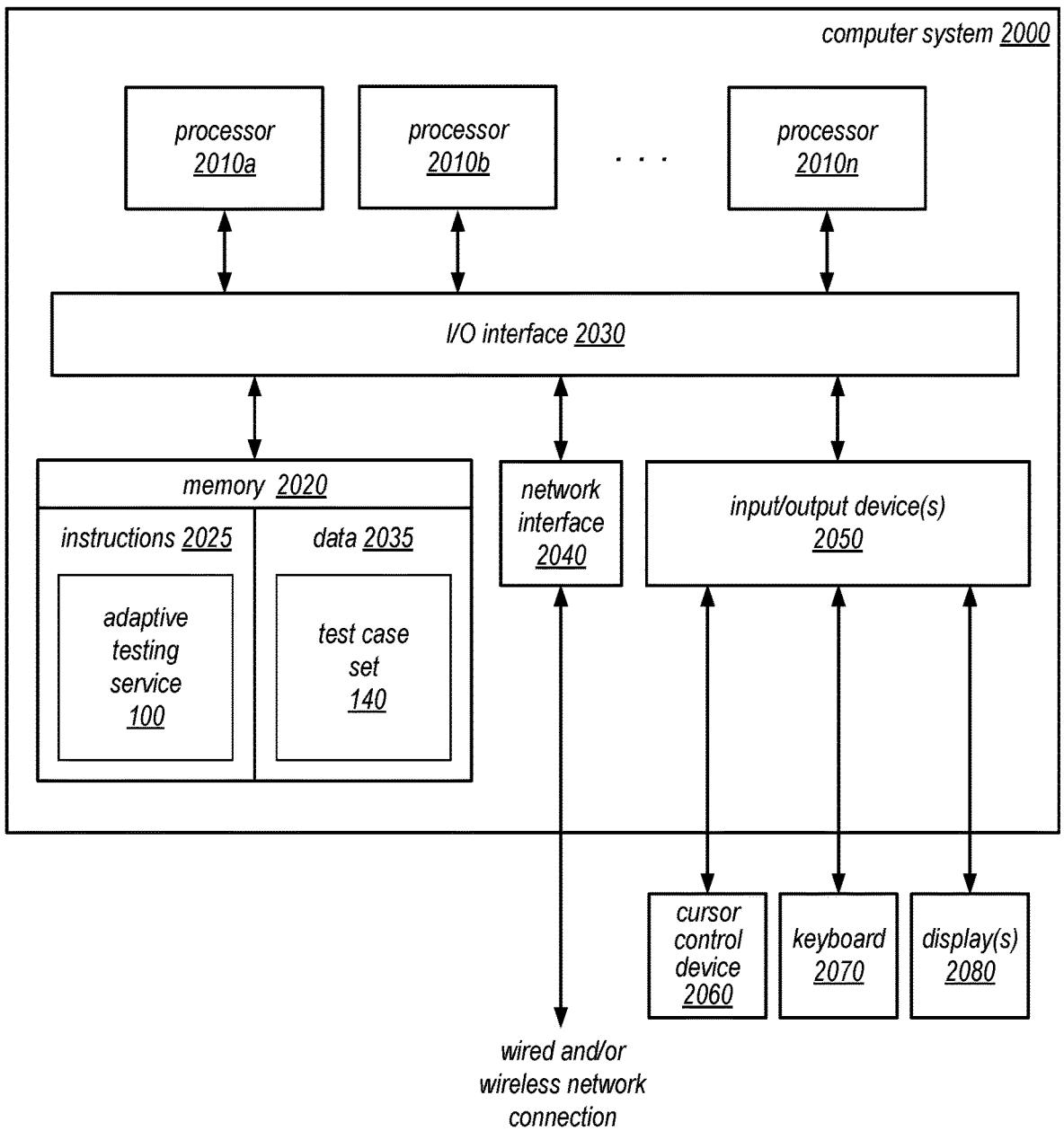
FIG. 10 illustrates example components of a computer system that may be used to implement components of the ATS described herein, according to some embodiments.

FIG. 10 illustrates example components of a computer system that may be used to implement components of the ATS 100 described herein, according to some embodiments.

In different embodiments, computer system 2000 may be any of various types of devices, including, but not limited to, a personal computer system, a server computer, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010).

In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. For example, the program instructions 2025 may be used to implement the functions of ATS 100. Data storage 2035 may include data that may be used in embodiments. For example, the data store 2035 may be used to store the test case set 140 generated by the ATS. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system comprising:
one or more computer devices that implement an adaptive testing service (ATS), configured to:
  execute a test case generation process, including to:
    receive telemetry data of a production version of a network service in a production environment;
    derive, from the telemetry data, a plurality of behaviors of the network service and frequency or recency metrics of individual ones of the behaviors;
    generate a plurality of test cases executable to test individual ones of the behaviors, including weights for individual ones of the test cases determined based at least in part on the frequency or recency metrics; and
    store the test cases and the weights in a test case repository; and
  execute a code change testing process, including to:
    receive a code change to a development version of the network service in a development environment;
    execute the test cases in the test case repository to identify one or more changed behaviors of the development version of the network service as a result of the code change;
    determine to accept or reject the code change based at least in part on the one or more changed behaviors and one or more weights of one or more test cases that identified the one or more changed behaviors; and
    after the code change is applied into the development version, update at least one of the one or more weights to cause at least one of the one or more test cases to be deprecated in the test case repository.

2. The system of claim 1, wherein:
the ATS is configured perform different types of tests on different types of network services in a plurality of environments;

the telemetry data is collected by one or more agents deployed in the production environment;

the agents are configured to perform test requests in the production environment according to instructions from a controller component of the ATS;

the ATS is configured to output test results obtained from the test requests via a user interface or an alarm; and the different types of tests include two or more of:
- a service performance test,
- a network connectivity test,
- a test of one or more HTTP behaviors,
- a test of one or more reverse proxy behaviors,
- an analysis of network packets, and
- a service performance test.

3. The system of claim 1, wherein ATS is configured to evolve the test cases in the test case repository, including to:

repeatedly update the test cases based on new telemetry data collected from the production version of the network service, including to (a) add a new test case for newly discovered behavior in the production version of the network service or (b) deprecate a test case or adjust a weight of the test case based on a change in the frequency or recency metrics of the test case; and repeatedly update the test cases based on new code changes in the development version of the network service, including to (a) add a new test case for new behavior added to the development version of the network service or (b) deprecate a test case or adjust a weight of the test case based on usage of the test case.

4. The system of claim 1, wherein the ATS is configured to:

derive, from telemetry data of multiple production versions of the network service executing in multiple production environments, a set of environment-neutral behaviors of the network service in the production environments;

add environment-specific parameters to individual ones of the environment-neutral behaviors to generate a set of environment-specific test cases for respective ones of the production versions; and execute the environment-specific test cases in respective ones of the production environments to test the respective ones of the production versions.

5. The system of claim 4, wherein the ATS is configured to execute the environment-specific test cases to monitor the production versions, wherein the monitoring verifies that:

(a) expected behaviors of an individual production version do not changed over time, and (b) corresponding behaviors of two production versions do not deviate.

6. The system of claim 1, wherein to generate a test case, the ATS is configured to:

generate the test case in a behavior specification language, wherein a precondition, a test action, and an expected outcome of the test case are expressed in a natural language; and generate a descriptive name for the test case in the natural language.

7. A method comprising:

executing, by an adaptive testing service (ATS) implemented by one or more computer devices, a test case generation process, including:

receiving telemetry data of a production version of a network service in a production environment;

deriving, from the telemetry data, a plurality of behaviors of the network service and frequency or recency metrics of individual ones of the behaviors;

generating a plurality of test cases executable to test individual ones of the behaviors, including weights for individual ones of the test cases determined based at least in part on the frequency or recency metrics; and storing the test cases and the weights in a test case repository; and executing, by the ATS, a code change testing process, including:

receiving a code change to a development version of the network service in a development environment;

executing the test cases in the test case repository to identify one or more changed behaviors of the development version of the network service as a result of the code change;

determining to accept or reject the code change based at least in part on the one or more changed behaviors and one or more weights of one or more test cases that identified the one or more changed behaviors; and updating the one or more weights of the one or more test cases based at least in part on one or more code changes to the development version.

8. The method of claim 7, further comprising the ATS:

repeatedly update the test cases based on new telemetry data collected from the production version of the network service, including to (a) add a new test case for newly discovered behavior in the production version of the network service or (b) deprecate a test case or adjust a weight of the test case based on a change in the frequency or recency metrics of the test case; and repeatedly update the test cases based on new code changes in the development version of the network service, including to (a) add a new test case for new behavior added to the development version of the network service, or (b) deprecate a test case or adjust a weight of the test case based on usage of the test case.

9. The method of claim 7, further comprising the ATS:

deriving, from telemetry data of multiple production versions of the network service executing in multiple production environments, a set of environment-neutral behaviors of the network service in the production environments;

adding environment-specific parameters to individual ones of the environment-neutral behaviors to generate a set of environment-specific test cases for respective ones of the production versions; and executing the environment-specific test cases in respective ones of the production environments to test the respective ones of the production versions.

10. The method of claim 7, wherein the deriving of the behaviors comprises applying a clustering or classification technique to the telemetry data to identify behavior classes.

11. The method of claim 7, wherein the telemetry data is collected by one or more agents deployed in the production environment.

12. The method of claim 7, wherein the weights are used in the code change testing process to (a) select test cases to use to test code changes to the network service or (b) select test cases to deprecate.

13. The method of claim 7, further comprising the ATS:

determining that the code change causes a changed behavior associated with test case;

generating user interface data indicating the code change, the changed behavior, and a weight of the test case; and receiving user input indicating whether the changed behavior is expected or desired, wherein the code change is accepted or rejected based at least in part on the user input.

14. The method of claim 13, wherein:
the changed behavior changes a previous behavior of the development version of the network service; and
the user interface data indicates a last time that the previous behavior was observed.

15. The method of claim 7, wherein generating a test case comprises:
generating the test case in a behavior specification language, wherein a precondition, a test action, and an expected test result of the test case are expressed in a natural language; and
generating a descriptive name for the test case in the natural language.

16. The method of claim 7, further comprising the ATS:
generating user interface data to implement a graphical user interface (GUI);
receiving, from the GUI, a user query to search the test case repository for one or more matching test cases;
causing the GUI to display a test case that matches the user query;
receiving, from the GUI, a user command to execute the test case on one or more environments;
executing the test case on the one or more environments according to the user command; and
causing the GUI to display test results obtained from the execution of the test case.

17. The method of claim 16, wherein the test results include results data associated with multiple network protocols, including two or more of:
(a) IP protocol,
(b) TCP protocol,
(c) DNS protocol,
(d) HTTP protocol, and
(e) SSL/TLS protocol.

18. The method of claim 16, wherein the test results include historical data collected during one or more previous executions of the test case.

19. The method of claim 7, further comprising the ATS generating and executing different types of test cases, including two or more test cases that specify two or more of:
a service performance test,
a network connectivity test,
a test of one or more HTTP behaviors,
a test of one or more reverse proxy behaviors,
an analysis of network packets, and
a service performance test.

20. One or more non-transitory computer-readable storage media storing program instructions executable by one or more processors to implement an adaptive testing service (ATS) and cause the ATS to:
execute a test case generation process, including to:
receive telemetry data of a production version of a network service in a production environment;
derive, from the telemetry data, a plurality of behaviors of the network service and frequency or recency metrics of individual ones of the behaviors;
generate a plurality of test cases executable to test individual ones of the behaviors, including weights for individual ones of the test cases determined based at least in part on the frequency or recency metrics; and
store the test cases and the weights in a test case repository; and
execute a code change testing process, including to:
receive a code change to a development version of the network service in a development environment;
execute the test cases in the test case repository to identify one or more changed behaviors of the development version of the network service as a result of the code change;
determine to accept or reject the code change based at least in part on the one or more changed behaviors and one or more weights of one or more test cases that identified the one or more changed behaviors; and
update the one or more weights of the one or more test cases based at least in part on one or more code changes to the development version.

* * * * *